April 9, 1935. W. S. MAYS 1,996,929
GREASE PACK FOR PRESSURE GREASE GUNS
Filed Oct. 18, 1932 2 Sheets-Sheet 1
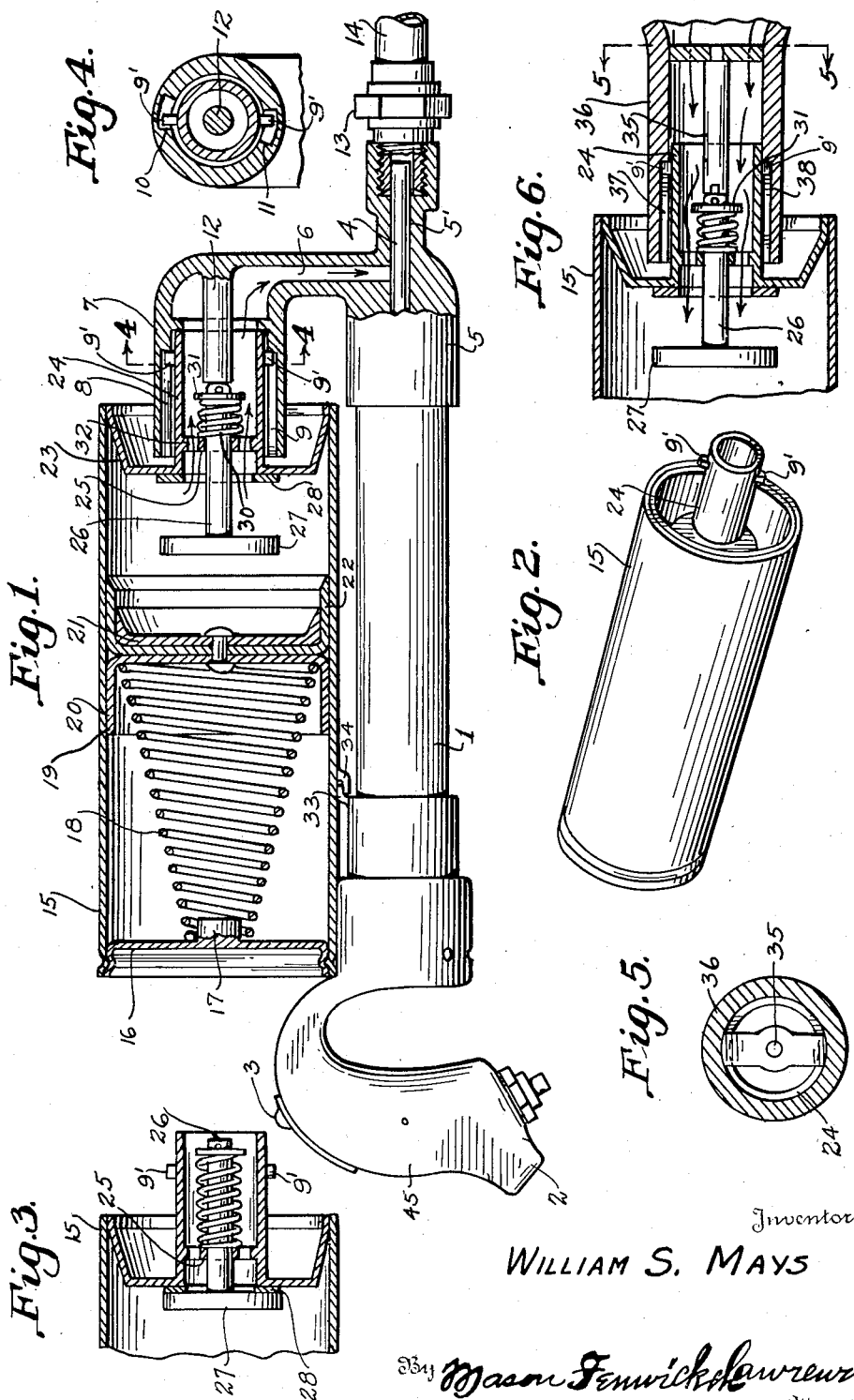
Inventor
WILLIAM S. MAYS

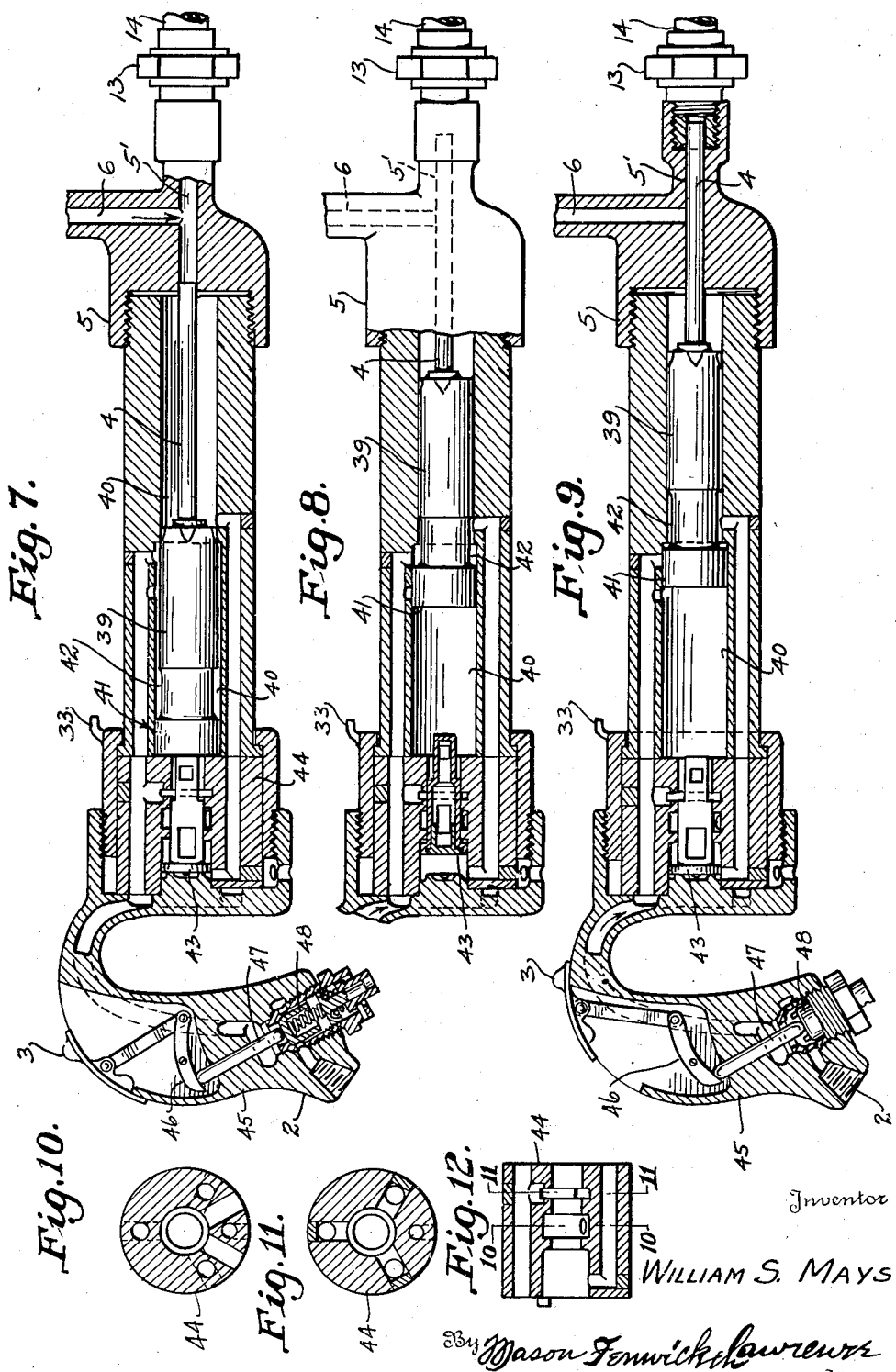

Patented Apr. 9, 1935

1,996,929

UNITED STATES PATENT OFFICE 1,996,929

GREASE PACK FOR PRESSURE GREASE GUNS

William S. Mays, Norfolk, Va., assignor of one-half to Joseph F. Ffolliott, Norfolk, Va.

Application October 18, 1932, Serial No. 638,375

3 Claims. (Cl. 221—47.3)

This invention relates to grease packs for pressure grease guns and it has for its principal object the provision of means for supplying a unit quantity of grease to the gun in package form, without the messiness which invariably attends the attempt to fill the gun with grease in loose bulk.

Another object of the invention is the provision of a grease pack designed to be quickly attached to a portable pressure grease gun and containing a charge of grease under pressure, with a valve-controlled discharge adapted to be coupled to the grease gun and automatically opened by engagement with an element of said grease gun when in coupled position.

Still another object of the invention is the provision of a grease pack having a valve-controlled discharge, in which the grease is maintained under pressure by a spring-pressed piston or follower, the pressure of the grease maintaining the valve closed until the valve is opened by superior pressure impressed upon it by an element of the grease gun to which the grease pack is adapted to be connected.

A further object of the invention is to provide a grease pack comprising a container with valve-controlled discharge and including a spring-pressed follower for maintaining a body of grease under pressure in said container and against said valve for maintaining the latter normally closed, the container being refillable by applying the discharge to a source of grease under a pressure superior to that of the spring-pressed follower, said source including an element engageable with said valve for positively opening it to provide for the passage of the grease.

Another object of the invention resides in the combination of a grease pack of the type described with a pressure grease gun including a differential piston reciprocating under fluid presure, the discharge element of said pack communicating with the high pressure side of said differential piston whereby grease is automatically fed to said high pressure piston under pressure of the spring follower of said grease pack and automatically delivered to the part to be lubricated through the differential pressure of the fluid which operates the piston, the feed of grease to the high pressure side being assisted and facilitated by the vacuum incidentally produced in the gun by the retraction of the high pressure portion of the piston.

Other objects of the invention will appear as the following description of a preferred and practical embodiment thereof proceeds.

In the drawings which accompany and form a part of the following specification and throughout the several figures of which the same characters of reference have been employed to designate identical parts, Figure 1 is a side elevation partly in section showing a grease gun equipped with a grease pack of my invention, the discharge valve being shown in open position;

Figure 2 is a perspective view of the grease pack;

Figure 3 is a detail in section showing the discharge end of the grease pack with the valve closed;

Figure 4 is a cross section taken along the line 4—4 of Figure 1;

Figure 5 is a cross section taken along the line 5—5 of Figure 6;

Figure 6 is a longitudinal section through a portion of the grease gun and the anterior part of a source of grease supply indicating how the grease pack is refilled;

Figures 7, 8 and 9 are sectional views of the pneumatic mechanism of the grease gun, showing the channel through which grease is admitted from the grease pack to the high side of the differential piston;

Figure 10 is a cross section taken along the line 10—10 of Figure 12;

Figure 11 is a cross section taken along the line 11—11 of Figure 12; and

Figure 12 is a longitudinal section through the valve chamber of the pneumatic portion of the grease gun.

Referring now in detail to the several figures and first adverting to that group of figures included on the first sheet of drawings, the numeral 1 represents a grease gun which is preferably of the pneumatic type receiving fluid pressure from a pneumatic source by way of the nipple 2. The admission of compressed air to the grease gun is manually controlled by a trigger 3, suitably disposed with relation to the handle of the grease gun and operates piston mechanism including the high pressure piston 4. The lower end of the grease gun is provided with a fitting 5 bored to form a cylinder 5' for the piston 4 and having a lateral passage 6 which debouches into a cup-shaped socket 7, the axis of which is preferably parallel with that of the barrel of the grease gun. The walls of said socket are preferably provided with longitudinal channels 8 and 9, the lower ends of which are angularly disposed forming bayonet slots 10 and 11 for receiving the lugs 9' carried by the grease pack. Within the socket 7 and arising from the base thereof, in an axial direction, is a boss 12 adapted to make contact with the discharge valve of the grease pack as will presently appear.

The cylinder 5' communicates with a nipple 13 to which is attached the grease hose 14, the latter being adapted to lead to the source or fitting to be lubricated.

The grease pack comprises a can or container 15, preferably cylindrical and permanently closed at the one end by a cap 16 secured in place in any suitable manner. Said cap on its inner face is provided with a boss 17 adapted to allocate and fix the smaller end of a coil spring 18, the larger end of which presses against a follower which in general is indicated by the reference character 19. The follower may be of any suitable construction, but is here shown as comprising a cup-shaped head 20 riveted or otherwise suitably secured to a washer 21, with a cup leather 22 intervening. The cup leather is preferably directed away from the spring 18; in other words, it faces the chamber of the container which functions as a reservoir for the grease.

The opposite end of the container is closed by a fitting 23 depressed from an outward direction and formed centrally with an outwardly extending discharge connection 24 having a spider 25 arranged transversely at an intermediate point, said spider being centrally perforated and serving as a guide for the stem 26 of a valve 27, the latter cooperating with an annular valve seat 28 formed on the fitting 23. The valve is normally maintained closed by means of a spring 30 compressively held between the spider 25 and a washer 31, suitably retained on said valve stem. The spider is provided with perforations 32 for the passage of the grease. The discharge connection 24 communicates with the cylinder 5' of the grease gun as has been stated, by means of the lateral passage 6.

The grease gun is provided with suitable quick attachable means for the grease pack, said means in the present instance being exemplified by the latch members 33 and 34, the former of which is fixed to the grease gun and the latter being secured to the grease pack. The relation of the latch member 34 to the grease pack is such that when the grease pack has been slightly rotated to bring the lugs 9' into the bayonet slots, said latch member 34 will pass beneath the latch member 33, holding the grease pack in position on the grease gun.

The grease pack after having been emptied may be removed from the grease gun and refilled by pressing the valve stem 26 against a boss 35 fixed within a spout 36, the latter forming part of a barrel or drum of grease. Said spout is provided with bayonet slots 37 and 38 preferably quite similar to the bayonet slots provided within the socket 7 and receiving the lugs 9'. When the grease pack is presented to the spout 26 in the manner shown in Figure 6, the valve 27 is opened and grease under the superior pressure in which it is stored in the tank enters the grease pack pressing the follower 19 back against the resistance of the spring 18 until the grease pack has been filled. The moment the grease pack is uncoupled from the spout 36, the valve 27 closes and the grease is retained under pressure in the grease pack.

In using the grease pack, it is placed in position relative to the grease gun in manner already described, the valve 27 being opened through contact with the boss 12 and the grease issuing under the pressure of the follower, filling the lateral passage 6. When the piston 4 has retracted so as to uncover the port formed by the end of the lateral passage 6, grease enters the cylinder 5' under the pressure of the spring follower. Upon its forward stroke, the high pressure piston 4 delivers the grease through the fitting 13 and hose 14 to the part to be lubricated. The continuous pressure of the grease pack maintains a body of grease always in the passage 6 in readiness to enter the cylinder 5' each time the piston 4 is retracted.

No novelty is claimed for the specific mechanism by means of which the piston 4 is reciprocated. Said piston as will be observed in Figures 7, 8 and 9 is a part of a larger piston 39 reciprocating in a cylinder 40. The piston 39 is provided with a head 41 of slightly larger diameter than the part 39 and travelling in a cylindrical bore of corresponding diameter. Between the part 39 and the head 41 is a circumferential channel 42. Valve mechanism 43 reciprocates in a valve cage 44 and in one position extends into the cylinder to be engaged by the head 41. The valve is connected with a system of ports which need not herein be described since they are fully disclosed in the patent to Meissner No. 626,497, the structure of which has been employed in the present specification as being exemplary of any form of pneumatic mechanism by which the piston of the grease gun may be rapidly reciprocated.

In operation, the grease pack having been connected to the grease gun, the latter is grasped by the handle 45 and the trigger 3 pushed forward to the position shown in Figure 9, actuating the lever 46 to depress the plunger 47 operating a slide valve 48 which admits air under pressure through the nipple 2. The air causes a rapid reciprocation of the piston 4 which drives successive charges of grease into the bearing or other point to be lubricated. When the trigger 3 is pushed back to the position shown in Figure 7, the valve 48 is released and the supply of air to the pneumatic actuating mechanism cut off.

It is to be understood that any form of grease gun having a high pressure plunger may be employed with the device of my invention, and that the invention resides primarily in the grease pack, with such portions of the grease gun as may be necessary to enable it to perform its cooperative functions.

What I claim is:

1. In combination, a grease gun and a grease pack therefor, said grease gun including a fitting providing a cylinder, a piston reciprocating in said cylinder, a discharge for said cylinder, said fitting being provided with a laterally disposed portion forming a socket communicating with said cylinder at a point remote from its discharge end, said grease pack comprising a container having a discharge connection at one end adapted to slip into said socket, cooperating coupling means on said connection and within said socket, a valve within said container normally closing the inner end of said connection and having a stem extending into said connection, a spring pressed follower within said container defining with the valved end of said container a reservoir for grease, and means arising from the bottom of said socket, engageable with said valve stem when said connection is coupled within said socket for opening said valve to permit the discharge of grease into said grease gun under the pressure of said spring pressed follower.

2. Grease gun adapted to be coupled to a grease pack comprising a barrel portion including a cylinder, a piston reciprocable within said cylinder under fluid pressure, a discharge at the outer end of said cylinder, said barrel being provided with a lateral extension forming a socket and having a passage communicating with said cylinder at a point remote from the discharge end and uncovered by said piston, said socket being adapted to receive a connection projecting from an end of said grease pack, said socket being formed with coupling means adapted to cooperate with coupling means on said grease pack and with an element arising from the interior thereof adapted automatically to open a discharge valve in said grease pack when the latter is coupled to said grease gun.

3. In combination, a grease gun having a coupling socket, a fixed rod extending longitudinally within said socket, a grease pack comprising a container having a discharge connection at one end adapted to slip in said socket, cooperating coupling means on said connection and within said socket, a valve normally closing the inner end of said connection having a stem extending into said connection, said stem being depressed by contact with said rod when said container is in coupled position for opening said valve and admitting grease under pressure from said container to said grease gun.

WILLIAM S. MAYS.